United States Patent
Peterson et al.

(10) Patent No.: US 12,067,858 B2
(45) Date of Patent: Aug. 20, 2024

(54) UPDATING PERSISTENT DISPLAYS FOR INDUSTRIAL DEVICES

(71) Applicant: ROCKWELL AUTOMATION TECHNOLOGIES, INC., Mayfield Heights, OH (US)

(72) Inventors: Corey Peterson, Grafton, WI (US); Alissa Shortreed, Milwaukee, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 253 days.

(21) Appl. No.: 17/692,125

(22) Filed: Mar. 10, 2022

(65) Prior Publication Data

US 2023/0290240 A1    Sep. 14, 2023

(51) Int. Cl.
*G08B 21/18*    (2006.01)
*G06F 3/14*    (2006.01)

(52) U.S. Cl.
CPC ............ *G08B 21/182* (2013.01); *G06F 3/14* (2013.01)

(58) Field of Classification Search
CPC .... G06F 3/14; G09G 2380/06; G05B 23/0272
See application file for complete search history.

(56) References Cited

U.S. PATENT DOCUMENTS

| | | | |
|---|---|---|---|
| 2011/0213488 A1* | 9/2011 | Suzuki | G05B 23/0272 700/109 |
| 2015/0118958 A1* | 4/2015 | Jain | G06Q 20/425 455/41.1 |
| 2016/0004891 A1* | 1/2016 | Moon | G09F 3/208 340/10.51 |
| 2017/0094228 A1* | 3/2017 | Israelson | G06T 3/4038 |
| 2017/0206047 A1* | 7/2017 | Halterman | G05B 19/056 |
| 2020/0098331 A1 | 3/2020 | Sweet | |
| 2021/0029101 A1* | 1/2021 | Igari | G06K 7/1417 |

FOREIGN PATENT DOCUMENTS

EP    3859728 A1    8/2021

OTHER PUBLICATIONS

Extended European Search Report for Application No. 23157366.38 mailed Jul. 12, 2023, 10 pages.

* cited by examiner

*Primary Examiner* — Thomas S McCormack
(74) *Attorney, Agent, or Firm* — Fletcher Yoder, P.C.

(57) ABSTRACT

A system may include a device that has one or more components that may perform one or more operations of an industrial automation system. The device may detect a change in an operation of the one or more components and generate a signal representative of the change. The system may also include one or more persistent display tags that may correspond to the one or more components. The one or more persistent display tags may receive the signal from the device and update a display in response to receiving the signal.

14 Claims, 4 Drawing Sheets

UPDATING PERSISTENT DISPLAYS FOR INDUSTRIAL DEVICES

BACKGROUND

This disclosure relates generally to persistent display tags corresponding to respective components of an industrial automation system. More particularly, embodiments of the present disclosure are related to updating the persistent display tags (e.g., using near-field communication tags) to reflect changes in respective components of the industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of components, such as valves, electric motors, a wide range of sensors, other suitable monitoring devices, or the like. Monitoring systems, such as programming terminals, automation controllers (e.g., programmable logic controller (PLC) or a programmable logic device (PLD)), input/output (I/O) modules, communication networks, human-machine interface (HMI) terminals, and the like, may use the statuses and/or received information to provide alerts to operators to change or adjust operation of one or more components of the industrial automation system (e.g., such as adjusting operation of one or more actuators), to manage the industrial automation system, or the like.

The industrial automation system may include a control cabinet that houses one or more devices (e.g., drives) that may control respective components (e.g., electric motors, sensors). The devices may be connected to a communication network (e.g., Ethernet network), such that a device (e.g., control system of a drive) may receive statuses, information, changes in operating condition from respective components, and the like. Further, an exterior surface (e.g., door) of the control cabinet may include tags that provide information corresponding to respective components of the industrial automation system. A tag may include a nameplate, a status, and additional information associated with a component. To account for user input associated with the component and/or changes in operating conditions of the component, an operator of the industrial automation may replace the tag or manually update the tag to reflect the changes in operating condition and/or user input. However, replacing or manually updating physical tags may be cumbersome and not ideal to a customer's needs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a device that has one or more components that may perform one or more operations of an industrial automation system. The device may detect a change in an operation of the one or more components and generate a signal representative of the change. The system may also include one or more persistent display tags that may correspond to the one or more components. The one or more persistent display tags may receive the signal from the device and update a display in response to receiving the signal.

In a further embodiment, an apparatus may include a processor and one or more antennas. The processor may receive one or more indications of one or more changes to one or more components associated with an industrial device, generate one or more signals in response to receiving the one or more indications, and automatically transmit the one or more signals to one or more persistent display tags associated with the one or more components. The one or more signals may cause the one or more persistent display tags to update one or more visualizations based on the one or more signals.

In an additional embodiment, a method may include receiving, via a processor, one or more indications of one or more changes to one or more components associated with an industrial device. The method may then involve generating, via the processor, one or more signals in response to receiving the one or more indications. The method may also include automatically transmitting, via the processor, the one or more signals to one or more persistent display tags associated with the one or more components via one or more antennas communicatively coupled to the processor. The one or more signals may cause the one or more persistent display tags to update one or more visualizations based on the one or more signals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
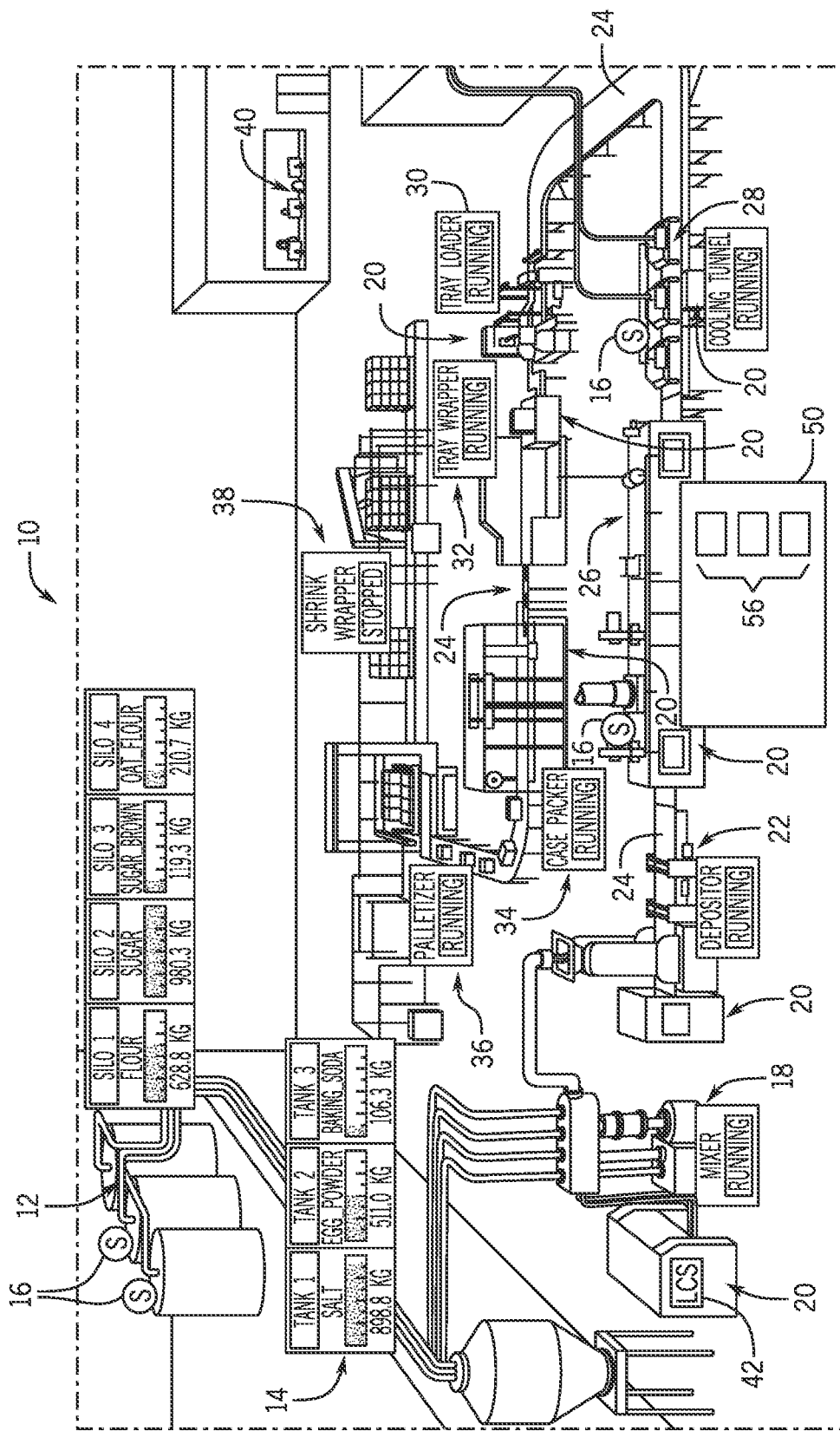
FIG. 1 illustrates an example industrial automation system employed by a food manufacturer, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a drive associated with a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

To improve operation of industrial automation systems, one or more monitoring systems of the industrial automation system (e.g., supervisory control system) may monitor performance of one or more components (e.g., machines, sensors) with respect to the industrial automation process as a whole. Statuses and/or information associated with the one or more components may be sent from the one or more monitoring systems (e.g., supervisory control system) as one or more signals to respective devices (e.g., control systems of drives) within a control cabinet via an Ethernet network. In some embodiments, respective devices (e.g., a control systems of a drives) may use the statuses and/or information to make control decisions based on the one or more components controlled by or coupled to the device. As mentioned above, each device may be housed in a control cabinet associated with the industrial automation system.

As used herein, a device may include any suitable industrial device, such as a drive, a contactor, an electrical switch, or the like. For example, the device may include a drive that includes a control system to control operations of respective components (e.g., load devices, motor). In addition, the device may include one or more processors and one or more memories. The one or more processors may include one or more general purpose microprocessors, one or more application specific processors, one or more application specific integrated circuits (ASICs), one or more field programmable gate arrays (FPGAs), or any combination thereof. Additionally or alternatively, the one or more memories may include one or more tangible, non-transitory, computer-readable media that store instructions executable by the one or more processors and/or data to be processed by the one or more processors. For example, the one or more memories may include random access memory (RAM), read only memory (ROM, rewritable non-volatile memory, such as flash memory, hard drives, optical discs, and/or the like.

The device may also include communication components that may transmit and/or receive signals from one or more external devices. The communication components may transmit and/or receive signals in any suitable communication protocol, such as near-field communication, Bluetooth®, radio frequency, and the like.

Keeping this in mind, informational tags (e.g., nameplate, information) corresponding to respective components may be disposed on an exterior surface (e.g., door) of the control cabinet. Each tag may include nameplate data, information (e.g., rating, precautions) associated with a respective component, and the like. Often times, the tag may not be updated accurately to reflect changes to the respective component based on the component being replaces, operating conditions of the component being altered, or the like. Indeed, when a physical tag (e.g., label) is attached to the door of the control cabinet, an operator monitoring components of the industrial automation system may have to replace the physical tag to accurately reflect any changes made to the respective component. Replacing the physical tag or updating the physical tag manually may be cumbersome and an inefficient use of human resources.

Accordingly, the present disclosure provides techniques for updating persistent display tags using various communication schemes (e.g., near-field communication (NFC) tags, radio-frequency identification (RFID) tags) to enable for user input, present information related to changes in operating conditions of the one or more components, and the like. As used herein, a persistent display tag (e.g., a persistent electronic display) refers to any suitable technique utilizing the reflection of light, instead of the emitting of light, to display image data (e.g., visualizations) while consuming little or no power (e.g., 1-5 milliamperes per refresh of image data). For example, an industrial automation component may receive electrical power to perform an operation, but the persistent display may not have to use such electrical power and/or may use a low amount of electrical power from a different power source (e.g., a stored electrical power) to maintain the presentation of image data. Rather, some electrical power may be used to adjust the image data presented by the persistent display tag, but the persistent display tag may maintain presentation of the image data independently of the power used to operate the industrial automation component. Indeed, in some embodiments, the persistent display tag may use electrophoretic display techniques to position reflective particles in a desirable arrangement in order to reflect light in a manner that presents a target image data. Thus, the persistent display tag may continue to present information even when power is not readily provided or available to operate the industrial automation component.

Keeping this in mind, persistent display tags may be used in a variety of ways to provide more effective notices of operations of devices or components within an industrial automation system. That is, as mentioned above, a control cabinet that may be part of the industrial automation system may house a number of devices, such as drives, contactors, and electrical switches. Each device may be associated with a status and/or information (e.g., motor, sensor, load device) of one or more other components of the industrial automation system. For instance, the device may include a drive coupled to a contactor, which may correspond to the component. In some embodiments, devices located within an interior space of the control cabinet may be communicatively coupled to respective persistent display tags attached to an exterior surface (e.g., door) of the control cabinet. Statuses and/or information of components received by respective devices may be presented by the respective persistent display tags and/or stored in an accompanying memory or storage component. In any case, a person operating and/or monitoring the industrial automation system may view the updated status or information related to a component inside cabinetry by referencing the information presented on the persistent display tag to efficiently retrieve or learn about various statuses, states, operations, and other properties of the respective component.

Further, one or more antennas connected to the one or more the persistent display tags may enable the persistent display tags to be updated based on status and/or information related to respective components received or generated by corresponding devices within the control cabinet. The one or more antennas may be positioned within the control cabinet to allow the statuses and/or information to be efficiently transmitted from a device within an interior space of the control cabinet to the persistent display tag positioned on an exterior of the control cabinet. As such, the persistent display tags (e.g., NFC tags, RFID tags) may operate based on radio-frequency energy or any other suitable wireless communication protocol.

In some embodiments, multiple antennas of an antenna group or module may be communicatively coupled to a respective device and each of the antennas may emit radio frequency signals that may form a beam. For example, within the interior space of the control cabinet, each device may be communicatively coupled to a different antenna. The different antennas may be communicatively coupled to a primary antenna that forwards data or signals representative of statuses and/or information received from devices via the respective different antenna to persistent display tags.

In other embodiments, each device disposed inside the control cabinet may include a single antenna. For example, a contactor device may send a status and/or information as a digital signal via the single antenna. In turn, the single antenna may transmit the digital signal to a corresponding receiving antenna of a persistent display tag, causing the persistent display tag to be updated based on the radio-frequency signal.

As used herein, the status and/or information of the component may include operating conditions (e.g., temperature, voltage, current, switching frequency, torque), abnormal conditions (e.g., electrical fault), manufacturing information, warranty information, change in position and/or orientation of the component within the industrial automation system, and so forth. By employing persistent display tags on the control cabinet of the industrial automation system, the persistent display tags may be updated to reflect any changes in a corresponding component in or near real-time.

As mentioned above, the status and/or information of a component may be stored in a memory that accessible by an operator or customer of the industrial automation system. In some embodiments, the persistent display tag may display nameplate data, an electrical one-line diagram, a machine-readable image associated with the component, and the like. The machine-readable image may provide an operator or customer with additional information (e.g., manufacturing information, warranty information) that may not be displayed via the electronic tag. In additional and/or alternative embodiments, the persistent display tag may include an indicator (e.g., flashing light-emitting diode (LED), red flag) that serves as an alert in response to a device receiving an abnormal condition associated with a component (e.g., temperature of the component outside of a threshold range).

In some embodiments, the persistent display tags may be updated periodically based on the status and/or information of components (e.g., every minute, every hour, every day). In other embodiments, the persistent display tags may be updated in or near real-time based on changes associated with the component. The status and/or information of components stored in memory of respective persistent display tag may be periodically transmitted to a local database. It can be appreciated that in cases of network failure associated with the industrial automation system, data associated with the persistent display tags may still be accessible via the local database.

In additional and/or alternative embodiments, the persistent display tags may be updated based on user input. For example, a customer may request a name change for a component, a change in location of the component within the industrial automation system, a change in format of a display of the electronic tag, and so forth. To address the customer's request, an NFC or RFID enabled electronic device (e.g., smartphone, laptop, a handheld writer) may be positioned within a threshold proximity of a particular persistent display tag to transfer data associated with the user's request from the NFC or RFID enabled electronic device to the particular persistent display tag. Additional details with regard to implementing the persistent display tags as described above will be detailed below with reference to FIGS. 1-4.

By way of introduction, FIG. 1 illustrates an example industrial automation system 10 employed by a food manufacturer in which the present embodiments may be implemented. It should be noted that although the example industrial automation system 10 of FIG. 1 is directed at a food manufacturer, the present embodiments described herein may be employed within any suitable industry, such as automotive, IT, mining, hydrocarbon production, manufacturing, and the like. The following brief description of the example industrial automation system 10 employed by the food manufacturer is provided herein to help facilitate a more comprehensive understanding of how the embodiments described herein may be applied to components and a manufacturing application system to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices (e.g., components 20) to control the operations of the mixer 18 and other machines. The industrial automation devices may include controllers, input/output (I/O) modules, motor control centers, motors, human machine interfaces (HMIs), operator interfaces, contactors, starters, sensors 16, actuators, conveyors, drives, relays, protection devices, switchgear, compressors, firewall, network switches (e.g., Ethernet switches, modular-managed, fixed-managed, service-router, industrial, unmanaged, etc.) and the like. The industrial automation devices, the mixer 18, and other machines are examples of components in the industrial automation system 10.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked Boxes together while on the pallet. The shrink-wrapped boxes may then be transported to storage or the like via a forklift or other suitable transport vehicle.

To perform the operations of each of the devices in the example industrial automation system 10, the industrial automation devices may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system, and the like. In some embodiments, each industrial automation device or a group of industrial automation devices may be controlled using a local control system (e.g., associated with a drive). The local control system may receive data regarding the operation of the respective industrial automation device, other industrial automation devices, user inputs, and other suitable inputs to control the operations of the respective industrial automation device(s) 20.

The local control system may have access to configuration data associated with the connected industrial automation devices (e.g., load device, motor). That is, the local control system may include memory or a storage component that stores information concerning the configuration of each industrial automation device connected to it. In some embodiments, the information or configuration data may be populated or input by an operator at the time the respective industrial automation device is installed. Additionally, the local control system may query the connected industrial automation device to retrieve configuration data, such as model number, serial number, firmware revision, assembly profile, and the like. In some embodiments, the supervisory control system may collect configuration data from multiple local control systems and store the information in a suitable memory or storage component.

As mentioned above, the industrial automation devices may be controlled using a local control system or a device housed within a control cabinet 50 of the industrial automation system 10. One or more devices may be disposed in a control cabinet 50 of the industrial automation system 10. As mentioned above, the devices may include a drive with a local control system, a contactor, an electrical switch, and the like. The one or more devices may correspond and be communicatively coupled to respective components and respective persistent display tags 56. The persistent display tags 56 may be disposed on an exterior surface (e.g., door) of the control cabinet 50.

Figure 2:
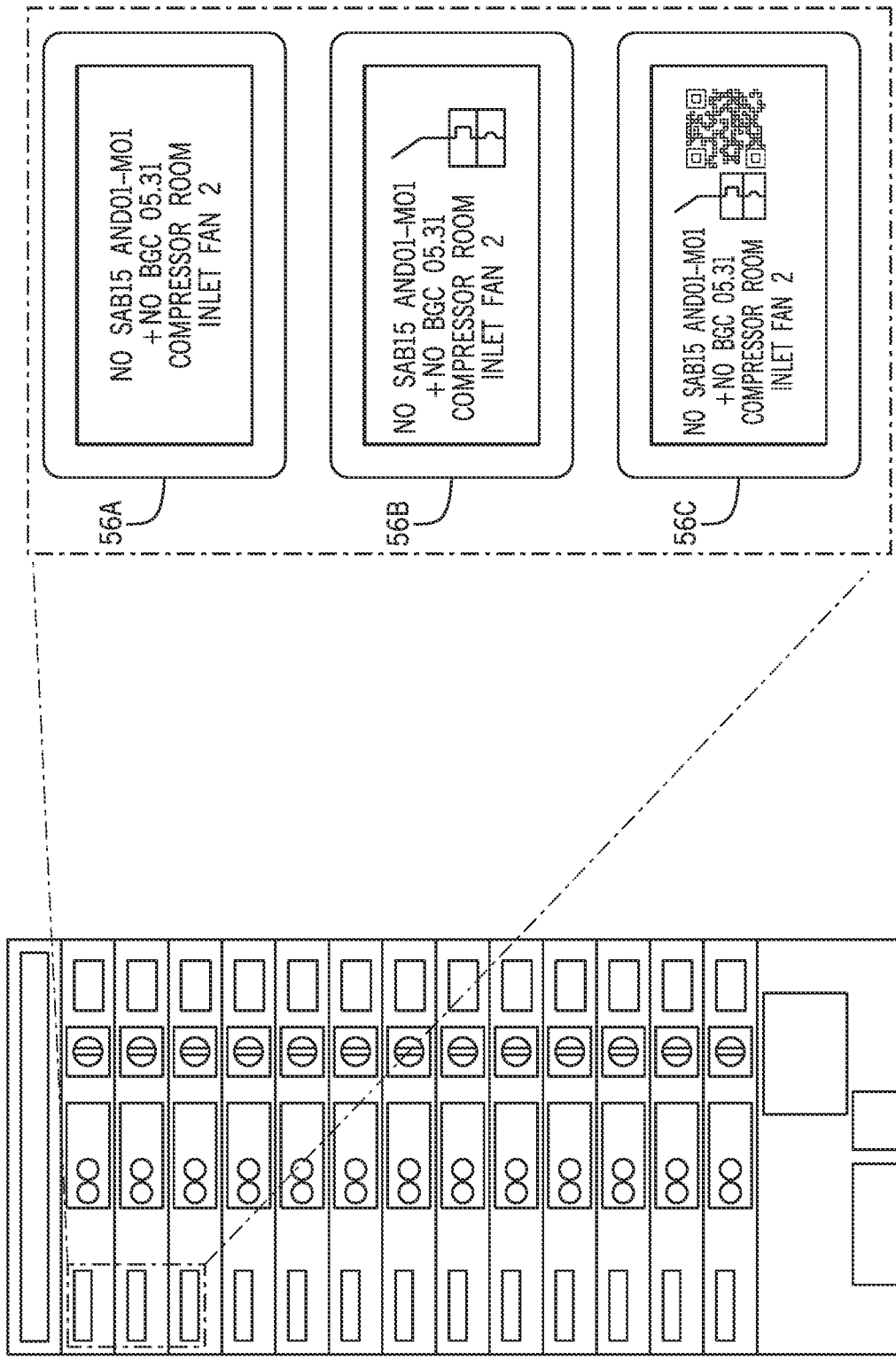
FIG. 2 illustrates example electronic ink display tags disposed on an exterior surface of a control cabinet of the industrial automation system of FIG. 1, in accordance with an embodiment of the present disclosure.

With the preceding in mind, FIG. 2, the persistent display tags 56 disposed on an exterior surface (e.g., door) of the control cabinet 50 of the industrial automation system 10, in accordance with an embodiment of the present disclosure. The persistent display tags 56 represent statuses and/or information related to a respective component 20 (e.g., industrial automation device) of the industrial automation system 10. In some embodiments, the persistent display tags 56 may display the statuses and/or information in any desired language (e.g., English, Spanish, Chinese). The persistent display tags 56 may display the statuses and/or information in one language or multiple languages. As mentioned above, the persistent display tags 56 may display nameplate data (e.g., naming parameter, electrical properties, operational properties, safety information), a one-line diagram related to the corresponding component, a machine readable image (e.g., Quick Response (QR) code, bar code, picture, text) that directs a computing device to a network location with additional information regarding the corresponding component, and so forth associated with respective components 20 (e.g., 20A, 20B, and 20C). As illustrated, the persistent display tag 56A displays nameplate data associated with component 20A. The persistent display tag 56B displays nameplate data and a one-line diagram associated with component 20B. In some embodiments, and the one-line diagram may provide a simplified visual representation of a component 20 within the industrial automation assembly 10 in two-dimensions. To generate the one-line diagram, an application or computing device may generate a graphical object representative of the component 20 in the industrial device system 10. The graphical object may be generated using scalable vector graphics.

Referring now to the persistent display tag 56C, in some embodiments, the persistent display tag 56C may display nameplate data, a one-line diagram, and a machine readable image associated with component 20C. By scanning the machine-readable image with an electronic device (e.g., a smartphone, a mixed reality headset), a computing device may access additional information related to the component 20C via a network location (e.g., website) accessed via the Machine-readable image displayed on the persistent display tag 56C, which may not have sufficient screen space to present the same information. For example, the network location may provide additional information such as manufacturing information, warranty information, a detailed history of operating conditions, a bill of materials, a cost, and so forth associated with the component 20C.

As mentioned above, the persistent display tags 56 may be updated in or near real-time to account for changes in operating conditions of the components 20. For example, data stored in memory component associated with the persistent display tag 56 and displayed by the persistent display tag 56 (e.g., nameplate data, one-line diagram, machine-readable image) may be updated to reflect the changes in operating conditions of a respective component 20.

One or more antennas may facilitate updating the persistent display tags 56 based on corresponding devices within the control cabinet 50 receiving status and/or information related to respective components 20. The control cabinet 50 includes a set of devices, where each device controls a respective component 20 (e.g., motor) of the industrial automation system 10 and may receive statuses and/or information from the respective component 20. In some embodiments, one or more of the devices may correspond to one or more persistent display tags 56 disposed on the exterior of the control cabinet 50. The persistent display tags 56 attached to the exterior of the control cabinet enable an operator or a customer to easily identify a component and its respective properties (e.g., status, operating condition). The one or more antennas may be housed within the control cabinet 50 to help facilitate the transmission and reception of statuses and/or information 14 between a device within an interior space of the control cabinet 50 and a persistent display tag 56 outside the interior space of the control cabinet 50. The persistent display tags 56 may operate based on wireless communication protocols that employ radio-frequency energy (e.g., RFID tags), near field communication, Bluetooth® communication, and the like.

The one or more antennas may transmit and receive data in an omnidirectional or directional configuration, in a single-beam, dual-beam, or multi-beam arrangement, and so on. Each of the antennas may be associated with one or more beams and various configurations. In some embodiments, multiple antennas of an antenna group or module may be communicatively coupled to one device disposed inside the control cabinet 50 and each of the multiple antennas may emits radio frequency signals that corresponds to a particular component 20 associated with the device. In another example, within the interior space of the control cabinet 50, each device may be communicatively coupled to a different antenna. The various antennas may be communicatively coupled to a primary antenna that transmits statuses and/or information from the devices to respective persistent display tags 56. In some embodiments, the primary antenna may be disposed behind a wall, the door (e.g., interior surface the door), or other material of the control cabinet 50. The primary antenna may be communicatively coupled to another antenna of the persistent display tags 56 attached in front of the exterior surface of the control cabinet 50. For example, a device may receive a status and/or information from a component 20 in the form of a digital signal to be transmitted via a respective antenna. Upon receiving the status and/or information from the component 20, the device may format the information into a signal that may be transmitted to the primary antenna via the respective antenna coupled to the device. In turn, the primary antenna may transmit a signal associated with the status and/or information of the component 20 to a corresponding antenna associated with the persistent display tag 56. In some embodiments, the primary antenna may be positioned within a threshold distance of the persistent display tags 56 and the other antennas may be positioned within a threshold distance from the primary antenna and close (e.g., within another threshold distance) to the respective devices. In this way, respective persistent display tags 56 may be updated to reflect changes on various devices that may be positioned in locations of the industrial automation system 10 that may be more than some distance in which the antennas of the persistent display tags 56 may be able to detect signals.

In other embodiments, a single antenna may be communicatively coupled to each respective device of an industrial automation system 10. The single antenna may be disposed behind the door (e.g., interior surface of the door) of the control cabinet 50. Each device may transmit data via the single antenna, such that a corresponding antenna of a corresponding persistent display tag 56 may receive the data. In turn, the corresponding persistent display tag 56 may be updated to present a visualization based on the received data.

In addition to updating the persistent display tags 56 based on various statuses, states, current operations, past operating conditions, and so forth of respective components 20, the persistent display tags 56 may be updated based on user input and/or a customer request. For example, a customer may request a name change for a component 20, a change in location of the component 20 within the industrial automation system 10, a change in language of the persistent display tag 56, and so forth. To address the customer's request, an electronic device (e.g., smartphone, laptop, a handheld writer) may be brought within a threshold proximity of a particular persistent display tag 56 to transfer data associated with the user's request from the electronic device to the particular persistent display tag 56. Using near-field or radio-frequency communication, the persistent display tag 56 may be updated based on a user or customer's preferences.

Figure 3:
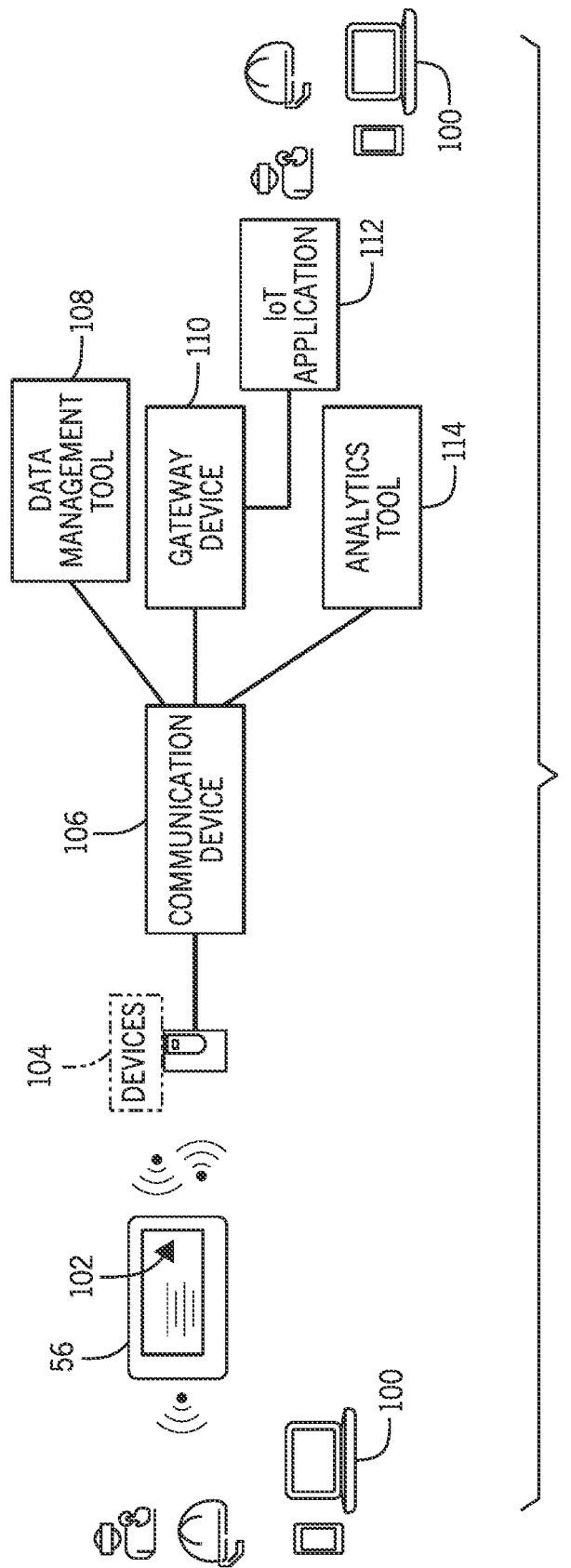
FIG. 3 is a schematic illustration depicting communication between the electronic ink display tags of FIG. 2 and monitoring systems of the industrial automation system, in accordance with an embodiment of the present disclosure.

Data stored in memory and displayed by the persistent display tags 56 may be valuable to operators and customers of the industrial automation system 10. As such, FIG. 3 is a schematic illustration depicting communication (e.g., data transmission) between the persistent display tags 56 and applications (e.g., manufacturing software) of the industrial automation system 10, in accordance with an embodiment of the present disclosure. As discussed above, the control cabinet 50 or the industrial automation system 10 may include devices 104 that are communicatively coupled and correspond to respective persistent display tags 56. For instance, as shown in FIG. 3, electronic devices 100 may communicate directly with the persistent display tags 56 via wireless communication protocols, such as near-field or radio-frequency communication. Examples of the electronic devices 100 include a smartphone, a laptop, a HoloLens device, a handheld writer and so forth. For example, the HoloLens device may scan a machine-readable image displayed by the persistent display tag 56 to retrieve information (e.g., a bill of material, manufacturing information, current state) related to a component 20 controlled by the device 104. As another example, a user may position the electronic device 100 to be within a threshold proximity (e.g., within 2 inches, 5 inches, 10 inches) of the persistent display tag 56 to update the content or format of data displayed by the persistent display tag.

In some embodiments, the persistent display tag 56 may include an indicator visualization 102 representative of an abnormal condition associated with the component 20. Based on receiving a signal representative of an abnormal condition associated with the component (e.g., temperature of the component 20 outside a threshold range), the device 104 may send an update to the persistent display tag 56 to include the indicator 102. Activating the indicator 102 may include alternating a position of the indicator 102 via the display of the persistent display tag 56. Furthermore, the persistent display tag 56 may communicate a variety of statuses through changing a variety of positions associated with the indicator 102 to alter an operator or customer regarding the status (e.g., abnormal condition) associated with the component. As mentioned above, the device 104 may receive various statuses, state, current operations, operating conditions (e.g., temperature, voltage, current, switching frequency, torque and so forth of the respective component 20. In some embodiments, the device 104 (e.g., drive) may include a local controller that determines an abnormal condition based analyzing statuses and/or information received from respective component 20. In other embodiments, the device 104 may receive an indication of the abnormal condition from a supervisory system monitoring the respective component 20 in the industrial automation system 10.

Such statuses and/or information displayed by or stored in memory of the persistent display tag 56 may be transmitted to other applications or computing devices. For example, the device 104 may cause the statuses and/or information corresponding to the respective component 20 and the persistent display tag 56 to be transmitted to the applications or other computing devices via a communication device 106. The applications may include a data management tool 108, an IoT application 112, an analytics tool 114, and the like. In some embodiments, the IoT application 112 may be communicatively coupled to the communication device 106 via a gateway device 110. The gateway device 110 may serve as an interface that is communicatively coupled to a network associated with the communication device 106 and a different network associated with the IoT application 112.

Figure 4:
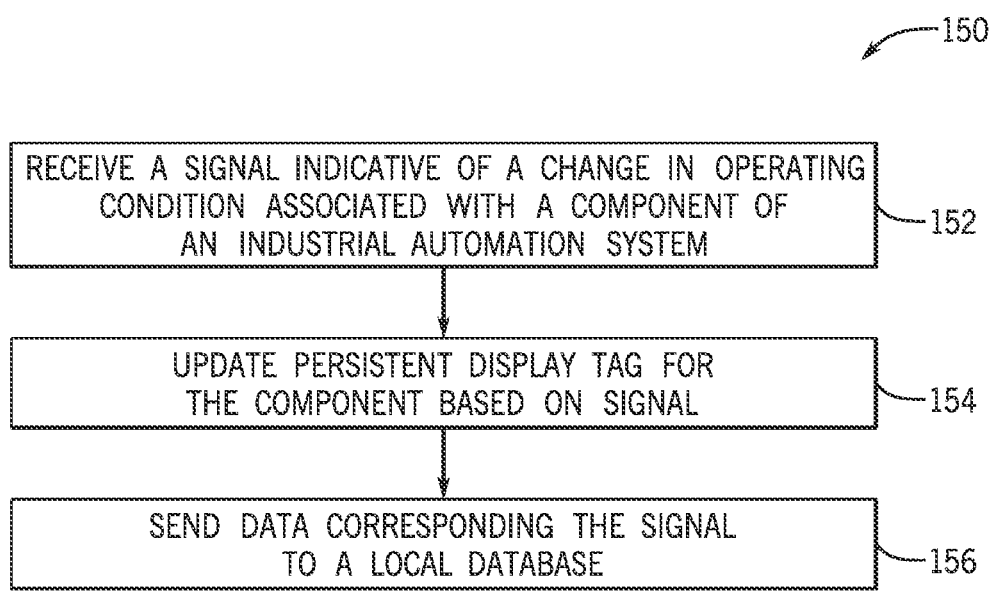
FIG. 4 is a flow chart of a process for updating the electronic ink display tags of FIG. 2 based on a change in operating condition associated with a component of the industrial automation system, in accordance with an embodiment of the present disclosure.

With the preceding in mind, FIG. 4 is a flow chart of a process 150 for updating the persistent display tags 56 based on a change in operating condition associated with respective components 20 of the industrial automation system 10. Although the following description of the process 150 will be discussed as being performed by a device that may include or control the component 20, it should be noted that any suitable computing component may perform the process 150. In addition, although the process 150 is described in a particular order, it should be noted that the process 150 may be performed in any suitable order.

At block 152, a device may receive a signal indicative of a change in operating condition associated with a respective component 20. In some embodiments, the device may be coupled to the respective component via a communication network (e.g., Ethernet network). As such, the device (e.g., drive) may receive the signal indicative of the change in operating condition via an Ethernet network. As used herein, the operating condition may include a temperature, voltage, current, switching frequency, torque and so forth of the respective component.

At block 154, the device may update a persistent display tag 56 associated with the device based on or in response to receiving the signal indicative of the change in operating condition associated with the respective component. In some embodiments, the device may automatically update the persistent display tag 56 in response to receiving the signal. As described in detail above, the device may generate a signal representative of an update to a visualization presented on the persistent display tag 56 based on the change in the operating condition. After generating the signals, the device may transmit the signal to one or more antennas communicatively coupled to the device and the persistent display tag 56. The one or more antennas may transmit the signal to another antenna associated with the persistent display tag 56. Based on the signal, the persistent display tag 56 may update a visualization displayed by the persistent display tag according to the change in operating condition.

At block 156, the device may update a local database to store the data displayed by the persistent display tag 56. By storing data associated with the persistent display tag 56 in a local database, the device may still provide remote access to the data for an operator or customer via a network or the like.

In additional and/or alternative embodiments, devices 104 within an interior space may be communicatively coupled to one or more communication jamming devices. In some embodiments, the devices 104 (e.g., drive) may include a local controller that may determine whether statuses and/or information received from respective components 20 are associated with a data breach or data vulnerability. In response to detecting hacking or a data breach associated with the statuses and/or information received from a respective component 20, the device 104 may instruct a jammer device to disrupt the transmission of the signal to the persistent display tag 56. Disrupting the electrical signal prevents the data from being presented via the corresponding persistent display tag.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a device comprising one or more components configured to perform one or more operations of an industrial automation system, wherein the device is configured to detect a change in an operation of the one or more components and generate a signal representative of the change;
one or more persistent display tags corresponding to the one or more components, wherein the one or more persistent display tags are configured to:
receive the signal from the device; and
update a display in response to receiving the signal, wherein the display is updated to present data comprising nameplate data, a one-line diagram, a machine-readable image, or any combination thereof associated with the one or more components, and wherein the machine-readable image is configured to cause a computing device to access a network location comprising additional data associated with the one or more components.

2. The system of claim 1, wherein the device is configured to transmit the signal to the one or more persistent display tags via one or more antennas.

3. The system of claim 2, wherein the one or more persistent display tags are disposed on an exterior of an enclosure and the one or more antennas are positioned on an interior of the enclosure.

4. The system of claim 1, wherein the additional data comprises manufacturing information, warranty information, a history of one or more previous operating conditions, a bill of materials, or any combination thereof associated with the one or more components.

5. The system of claim 1, wherein the one or more persistent display tags comprise a near-field communication (NFC) component configured to receive the signal.

6. The system of claim 1, wherein the one or more components comprise a contactor, a sensor, an electrical switch, or any combination thereof.

7. An apparatus, comprising:
a processor; and
one or more antennas, wherein the processor is configured to:
receive one or more indications of one or more changes to one or more components associated with an industrial device;
generate one or more signals in response to receiving the one or more indications; and
automatically transmit the one or more signals to one or more persistent display tags associated with the one or more components, wherein the one or more signals are configured to cause the one or more persistent display tags to update one or more visualizations based on the one or more signals, wherein the one or more persistent display tags are configured to communicatively couple to the one or more antennas via an additional antenna, wherein the one or more antennas are configured to transmit the one or more signals to the persistent display tags via the additional antenna.

8. The apparatus of claim 7, wherein the one or more indications are received in response to one or more abnormal conditions detected within the one or more components.

9. The apparatus of claim 8, wherein the one or more abnormal conditions correspond to one or more temperatures associated with the one or more components being outside one or more threshold ranges.

10. The apparatus of claim 7, wherein the one or more antennas are configured to be disposed in an interior space of an enclosure and the one or more persistent display tags are configured to be disposed on an exterior of the enclosure.

11. The apparatus of claim 7, wherein the processor is configured to store data associated with the one or more indications in a memory component.

12. A method, comprising:
receiving, via a processor, one or more indications of one or more changes to one or more components associated with an industrial device;
generating, via the processor, one or more signals in response to receiving the one or more indications; and
automatically transmitting, via the processor, the one or more signals to one or more persistent display tags associated with the one or more components via one or more antennas communicatively coupled to the processor, wherein the one or more signals are configured to cause the one or more persistent display tags to update one or more visualizations based on the one or more signals, wherein the one or more visualizations comprise nameplate data, a one-line diagram, a machine-readable image, or any combination thereof, and wherein the machine readable image is configured to cause a computing device to access a network location comprising information related to the one or more components.

13. The method of claim 12, wherein the machine-readable image comprises a Quick Response (QR) code.

14. The method of claim 12, wherein the one or more persistent display tags comprise a near-field communication (NFC) component configured to receive the one or more signals.

* * * * *